(12) United States Patent
Shigesada et al.

(10) Patent No.: US 6,824,279 B2
(45) Date of Patent: Nov. 30, 2004

(54) SEAL STRUCTURE OF DOOR MIRROR MOUNTING PORTION

(75) Inventors: Masaaki Shigesada, Kanagawa-ken (JP); Junichi Wakamatsu, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 456 days.

(21) Appl. No.: 09/998,297

(22) Filed: Dec. 3, 2001

(65) Prior Publication Data

US 2002/0083648 A1 Jul. 4, 2002

(30) Foreign Application Priority Data

Dec. 28, 2000 (JP) ..................................... P2000-402755

(51) Int. Cl.[7] ................................................ G02B 5/08
(52) U.S. Cl. ....................................................... 359/870
(58) Field of Search ................................ 359/870, 871; 248/475.1, 495, 496; 296/146.1

(56) References Cited

U.S. PATENT DOCUMENTS 4,936,537 A * 6/1990 Namba et al. ............ 248/475.1
5,651,578 A * 7/1997 Mistopoulos et al. ..... 296/146.9

FOREIGN PATENT DOCUMENTS

JP          7-84134          9/1995

* cited by examiner

Primary Examiner—Euncha P. Cherry
(74) Attorney, Agent, or Firm—McDermott Will & Emery LLP

(57) ABSTRACT

A seal structure of a door mirror mounting portion according to the present invention is constituted by a mirror base portion mounted to a door panel, a seal member held between the mirror base portion and the door panel, and a weather strip provided in the door panel and sealing between the door panel and a front pillar. A surface of the door panel to which the mirror base is mounted is offset to an inner side of the room from a general surface other than the door mirror mounting portion, and the seal member is extended to a side of the front pillar so as to be brought into contact with the weather strip and close between the mirror base portion and the front pillar. The mirror base does not protrude to a side portion of the vehicle, thereby improving an appearance, and an air stream in the portion becomes smooth at a time of traveling the vehicle, so that it is hard to generate the strong wind noise and the peeling in the end portion of the seal portion.

3 Claims, 3 Drawing Sheets

000# SEAL STRUCTURE OF DOOR MIRROR MOUNTING PORTION

BACKGROUND OF THE INVENTION

1. Field of the Invention

The present invention relates to a mounting structure of a door mirror of a vehicle to a side surface of a front door and the like, and more particularly to a seal structure of a door mirror mounting portion.

2. Description of the Related Art

Among backward confirming apparatuses of a vehicle, a side mirror is generally placed within a window frame of a door at present, and is called as a door mirror. The door mirror is mounted on the basis of a seal structure in order to prevent water or a wind from entering a door interior portion and an inner portion of a passenger room. With respect to the seal structure used in the window frame and the like of the vehicle or the like, there has known a structure shown in Japanese Patent Application Publication No. 7-84134.

SUMMARY OF THE INVENTION

In the mounting structure of the door mirror according to the conventional seal structure mentioned above, a mirror base portion protrudes to a side portion from a general surface on the vehicle side surface, for example, a door, a window, a front pillar and the other outer surfaces. This has been a serious restriction in view of design.

In order to restrict the protrusion of the mirror base portion, there can be considered a structure made such that a door panel in a portion to which the door mirror is mounted is offset to the passenger room. However, if the offset is performed while keeping the conventional seal structure, the seal portion is largely recessed inward from a side surface of the front pillar. An air stream is involved inside when the vehicle travels, and a spiral air stream is formed. The spiral air stream causes to generate a strong wind noise and generates a force peeling an end portion of the seal portion so as to flutter the portion, so that it is expected that an appearance be deteriorated.

The present invention provides a seal structure of a door mirror mounting portion, which does not generate a recess portion even when offsetting a mirror base portion to a side of a passenger room.

According to the present invention, there is provided a seal structure of a door mirror mounting portion comprising a mirror base portion, a seal member disposed between the mirror base portion and a door panel and a weather strip extending from the door panel sealing between the door panel and a front pillar, wherein a mounting surface of the door panel mounting the mirror base is offset to an inner side of the room from a general surface other than the door mirror mounting portion, and the seal member extends to a seal portion between a weather strip and the front pillar in a forward portion from the mirror base portion so as to close a gap between the mirror base portion and the front pillar.

Since the mirror base portion is offset to the inner side of the room from the general surface, the mirror base does not protrude to a side portion of the vehicle, thereby improving an appearance. Further, since the seal member closes a gap between the mirror base portion and the front pillar, the air stream in the portion becomes smooth at a time of traveling the vehicle, so that it is hard to generate the strong wind noise and the peeling in the end portion of the seal portion.

A front end of the seal member is brought into contact with the weather strip in a direction of pressing the weather strip to the front pillar at a time of closing the door. Accordingly, it is possible to more securely prevent an end portion of the weather strip from peeling from a seal surface.

Further, the front end of the seal member is hidden in the weather strip when seen from the forward of the front pillar, and an outer appearance of the weather strip, the mounting portion of the door mirror and the other general portions appear to be substantially continuously connected. Accordingly, it is possible to achieve an improved appearance.

DETAILED DESCRIPTION OF THE PREFERRED EMBODIMENT

Figure 1A:
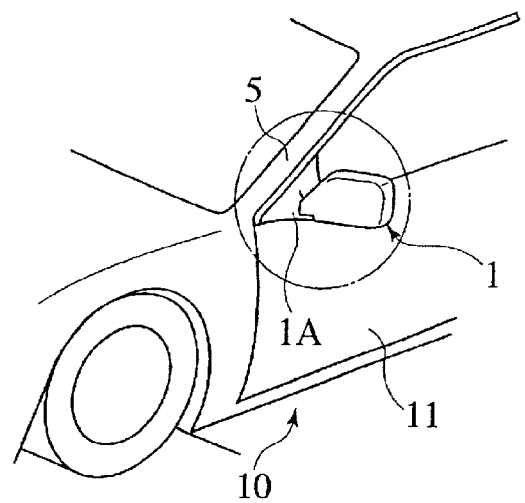
FIG. 1A is a perspective view showing a side portion of a vehicle according to the present invention.
Figure 1B:
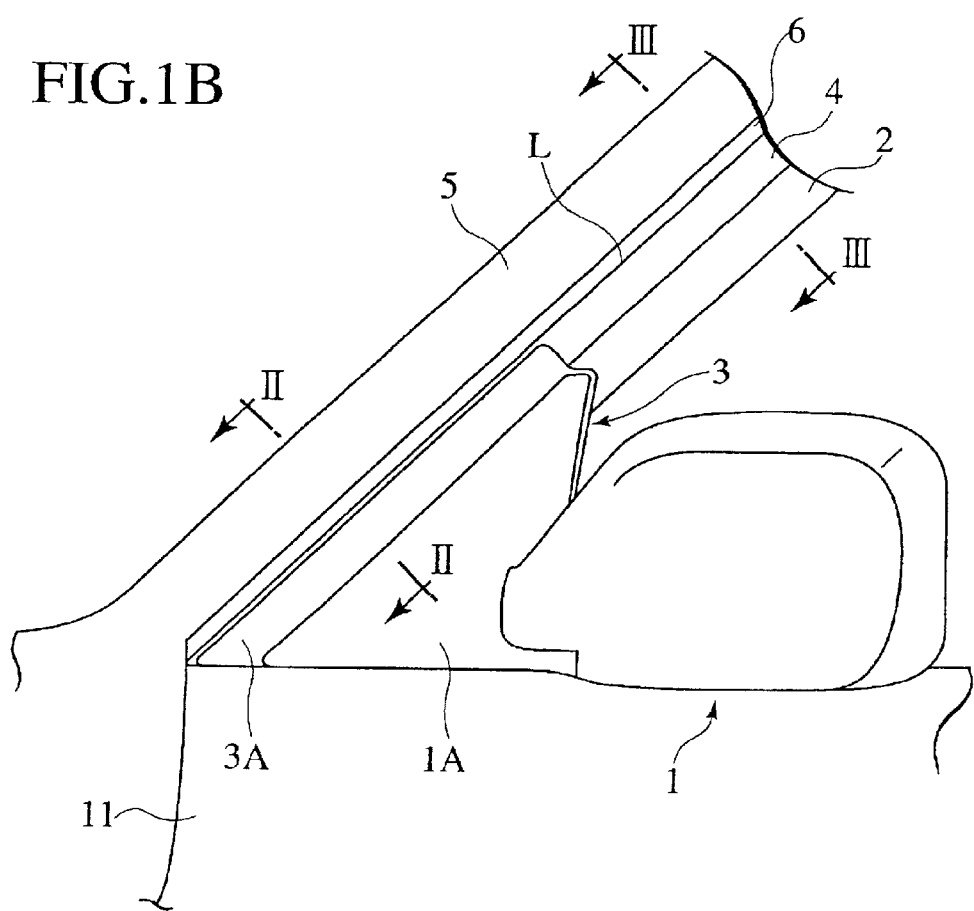
FIG. 1B is an enlarged perspective view showing a main portion of the side portion of the vehicle according to the present invention.

A description will be given of an embodiment according to the present invention with reference to FIGS. 1 to 3.

A door mirror 1 is structured such that a mirror base portion 1A thereof is mounted to a door panel 2 according to a known method. A seal member 3 is provided between the mirror base portion 1A and the door panel 2, and the seal member 3 is mounted to the door panel 2 together with the mirror base portion 1A. In the present embodiment, a position (X1) of a mounting surface 2A of the door panel is offset at a predetermined amount (t1) to an inner side of a passenger room from a position (Y1) of a general surface in a vehicle side portion corresponding to an outer surface such as a door 11, a window, a front pillar 5 and the like, in the same manner as the conventional one mentioned above, thereby preventing the mirror base portion 1A from protruding sideward too much from the general surface position (Y1) in a portion near the mounting portion of the door mirror 1 so as to deteriorate an appearance.

Reference numeral 4 denotes a weather strip for sealing between the door panel 2 and the front pillar 5. The weather strip 4 is provided with a base portion 4A for mounting to a mounting portion 2A provided in an edge portion of the door panel 2, a first seal portion 4B brought into contact with the front pillar 5 and a second seal portion provided in the front pillar 5 at an end portion close to a vehicle outer side from the first seal portion and brought into contact with a molding 6.

The molding 6 is fixed to an edge of the front pillar 5 by inserting and engaging engagement portions 6A with respect to mounting holes 5a provided at a plurality of portions in the front pillar 5. In this molding 6, a rubber seal 7 for filling in a gap between the molding 6 and the front pillar 5 is provided. Further, in general, a plating treatment is frequently applied to the molding 6 in order to improve an appearance, and the rubber seal 7 also serves to hide a back side (a hidden portion in a vehicle inner side) of the molding 6 to which the plating treatment is not applied.

Further, the seal member 3 is provided with an extended portion 3A extended forward from the mirror base portion 1A. The extended portion 3A is extended to a seal portion between a second seal portion 4C of the weather strip 4 disposed forward from the mirror base portion 1A and the molding 6 provided in the front pillar 5, and the extended portion 3A closes a gap between the mirror base portion 1A and the molding 6 provided in the front pillar 5.

A position at which the extended portion 3A is brought into contact with the weather strip 4 is a substantially back surface of a position at which the second seal portion 4C corresponding to the end portion of the weather strip 4 is brought into contact with the molding 6 provided in the front pillar 5, and when closing the door, the extended portion 3A presses the second seal portion 4C to the molding 6.

The front end of the extended portion 3A is hidden in the weather strip 4 when seen from the forward of the front pillar 5, and is brought into contact with the outer shape of the weather strip 4, the mounting portion of the door mirror 1 and the other general portions in a side close to the mirror base portion 1A rather than an outer shape line L of the weather strip 4, so as to be substantially continuously seen.

The second seal portion 4C corresponding to the front end of the weather strip 4 is pressed to the molding 6 by a proper urging force without being pressed excessively to the inner side of the passenger room by the extended portion 3A.

Figure 3:
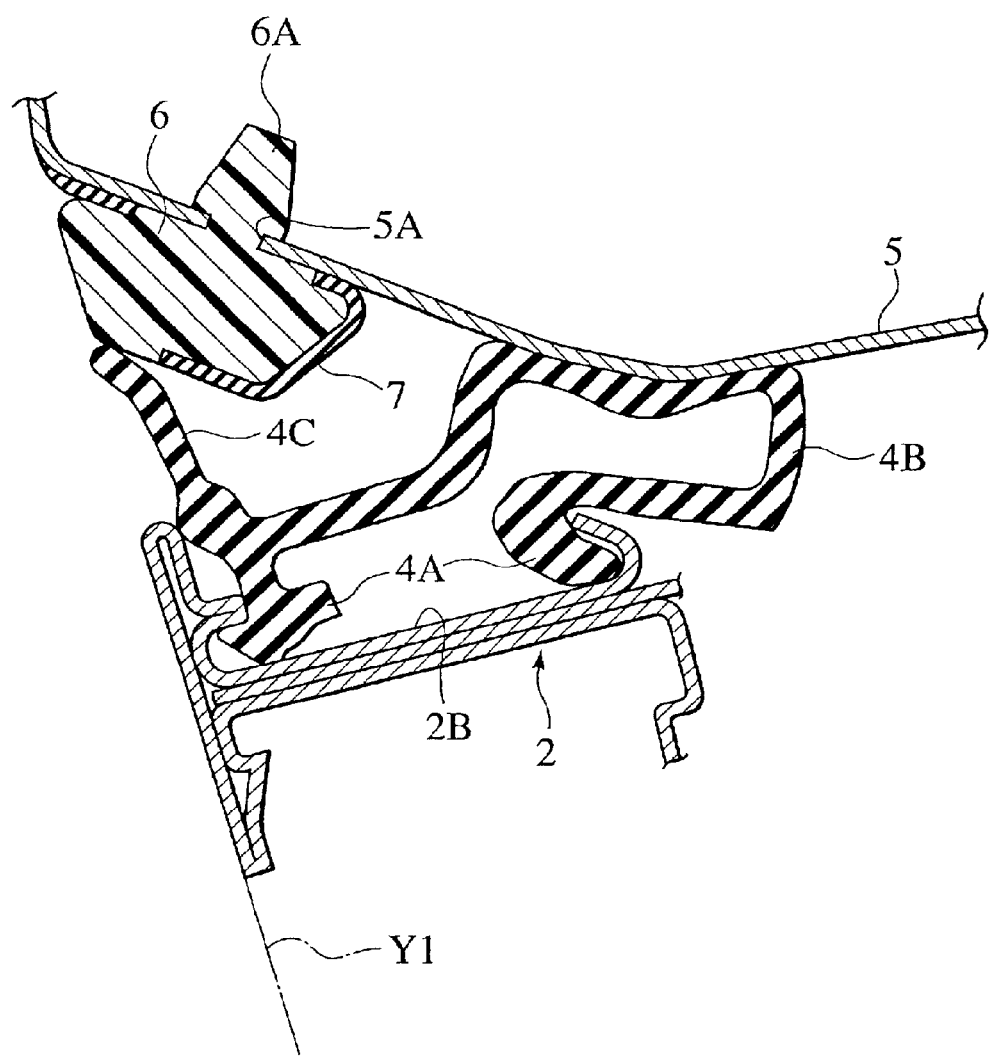
FIG. 3 is a cross sectional view cut along a line III—III in FIG. 1.

In the general portion shown in FIG. 3, the side surface of the door panel 2 exists at substantially the same position as the general surface position (Y1), and closes a gap between the front portion of the door panel 2 and the molding 6 provided in the front pillar 5 by using the second seal portion 4C of the weather strip 4, thereby smoothening the air stream around the vehicle side portion at a time when the vehicle travels.

According to the present embodiment of the present invention mentioned above, since the position (X1) of the mounting surface 2A of the door panel 2 to which the mirror base portion 1A is mounted is offset a the predetermined amount (t1) to the inner side of the passenger room from the other general surface position (Y1) than the mounting portion of the door mirror 1, it is possible to prevent the mirror base portion 1A from protruding to the vehicle side portion and it is possible to improve an appearance.

Further, since the seal member 3 is extended to a portion close to a contact portion between the second seal portion 4C corresponding to the seal portion between the weather strip 4 disposed forward the mirror base portion 1A and the front pillar 5, and the molding 6, and the extended portion 3A closes the gap between the mirror base portion 1A and the molding 6 provided in the front pillar 5, it is possible to smoothen the air stream around the vehicle side portion between the mirror base portion 1A of the door mirror 1 and the front pillar 5 at a time when the vehicle travels and it is possible to prevent a wind noise, even in the case that the position (X1) of the mounting surface 2A of the door panel to which the mirror base portion 1A is mounted is offset at the predetermined amount (t1) to the inner side of the passenger room from the general surface position (Y1).

Further, since the air stream becomes smooth as mentioned above, it is possible to prevent the end portion of the weather strip 4 from peeling from the seal surface, it is possible to prevent the wind noise from generating due to an invasion of the wind from the peeling portion, it is possible to prevent the end portion from being undulated due to fluttering of the portion generated by a repeated peeling, and it is expected to improve an appearance.

In addition to the effect mentioned above, according to the present embodiment of the present invention, since the weather strip 4 is pressed to the molding 6 by the extended portion 3A, it is possible to more securely prevent the end portion of the weather strip 4 from peeling from the seal surface.

Figure 2:
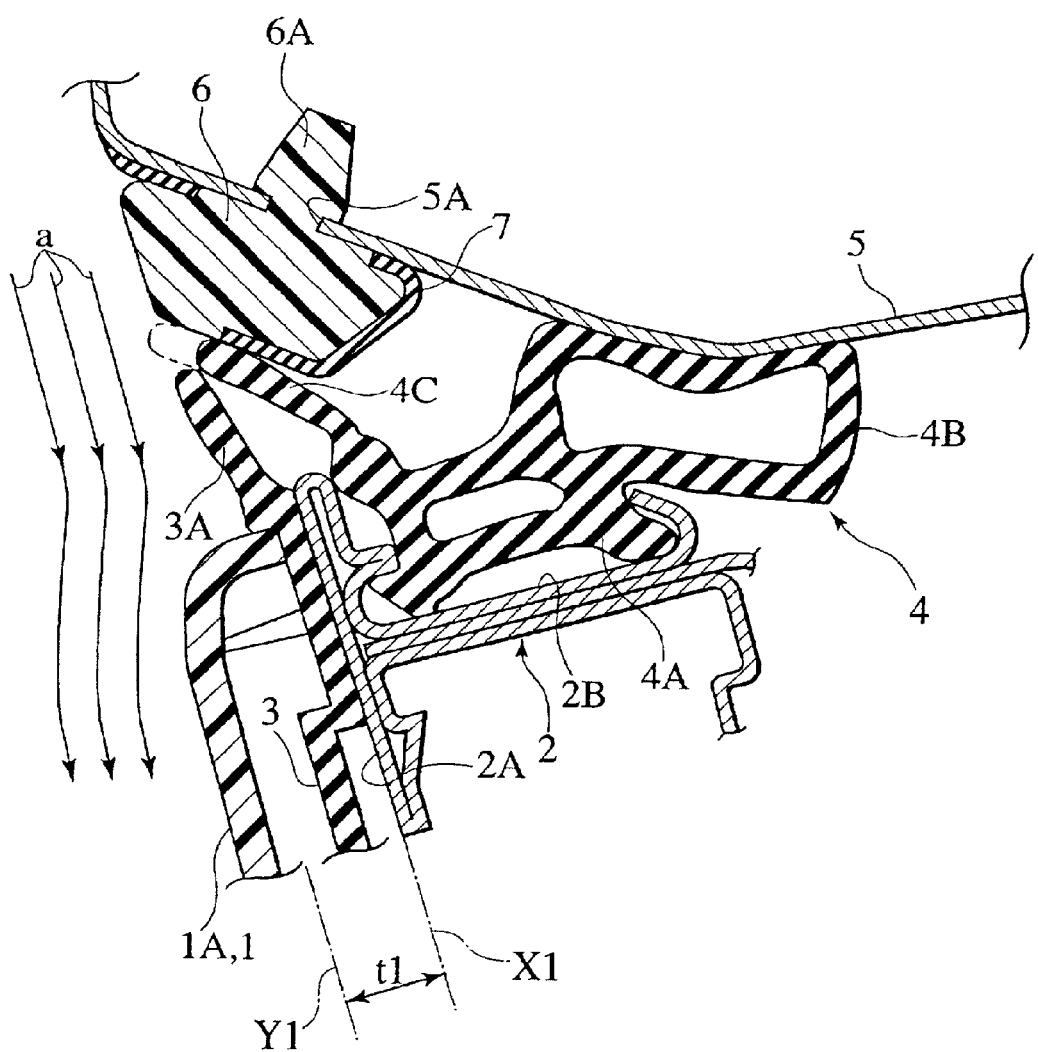
FIG. 2 is a cross sectional view cut along a line II—II in FIG. 1.

Further, even when the contact position between the weather strip 4 and the front pillar 5 somewhat changes in correspondence to the vehicle due to a part assembling error, a forming error and the like, as shown by an imaginary line in FIG. 2, the extended portion 3A presses the weather strip 4 to the molding 6, whereby it is possible to securely apply the seal to the portion.

Further, since the outer shape of the weather strip 4 is brought into contact with the side of the mirror base portion 1A rather than the outer shape line L of the weather strip 4 so as to be seen as being substantially continuously connected the mounting portion of the door mirror 1 and the other general portions when seen from the forward of the front pillar 5, the extended portion 3A does not protrude to the outer side from the outer shape of the weather strip 4 and it is possible to improve an appearance.

According to the present embodiment of the present invention, the second seal portion 4C is brought into contact with the molding 6 provided in the front pillar 5, however, according to the present invention, the weather strip 4 may be directly brought into contact with the front pillar 5 without the molding 6.

The contents of Japanese Patent Application No. 2000-402755 (filed Dec. 28, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A seal structure of a door mirror mounting portion comprising:

a mirror base portion mounted to a door panel;

a seal member held between the minor base portion and the door panel; and a weather strip provided in the door panel and sealing a gap between the door panel and a front pillar, wherein a surface of the door panel to which the mirror base is mounted is offset to an inner side of a passenger room from a general surface other than the door mirror mounting portion, and the seal member is extended to a side of the front pillar so as to be brought into contact with the weather strip and closes a gap between the mirror base portion and the front pillar.

2. A seal structure of a door mirror mounting portion comprising:

a mirror base portion mounted to a door panel;

a seal member held between the minor base portion and the door panel; and a weather strip provided in the door panel and sealing a gap between the door panel and a front pillar, wherein:

a surface of the door panel to which the mirror base is mounted is offset to an inner side of a passenger room from a general surface other than the door mirror mounting portion, and the seal member is extended to a side of the front pillar so as to be brought into contact with the weather strip and closes a gap between the mirror base portion and the front pillar and a position at which the seal member is brought into contact with the weather strip is a substantially back surface of a position at which the weather strip is brought into contact with the front pillar and the weather strip is pressed to the front pillar by the seal member when closing the door.

3. A seal structure of a door mirror mounting portion according to claim 2, wherein a front end of the seal member is hidden in the weather strip when seen from the forward of the front pillar, and an outer appearance of the weather strip, the mounting portion of the door mirror and the other general portions appear to be substantially continuously connected.

* * * * *